R. E. BROWN.
WIRE ROPE SOCKET.
APPLICATION FILED MAR. 10, 1915.

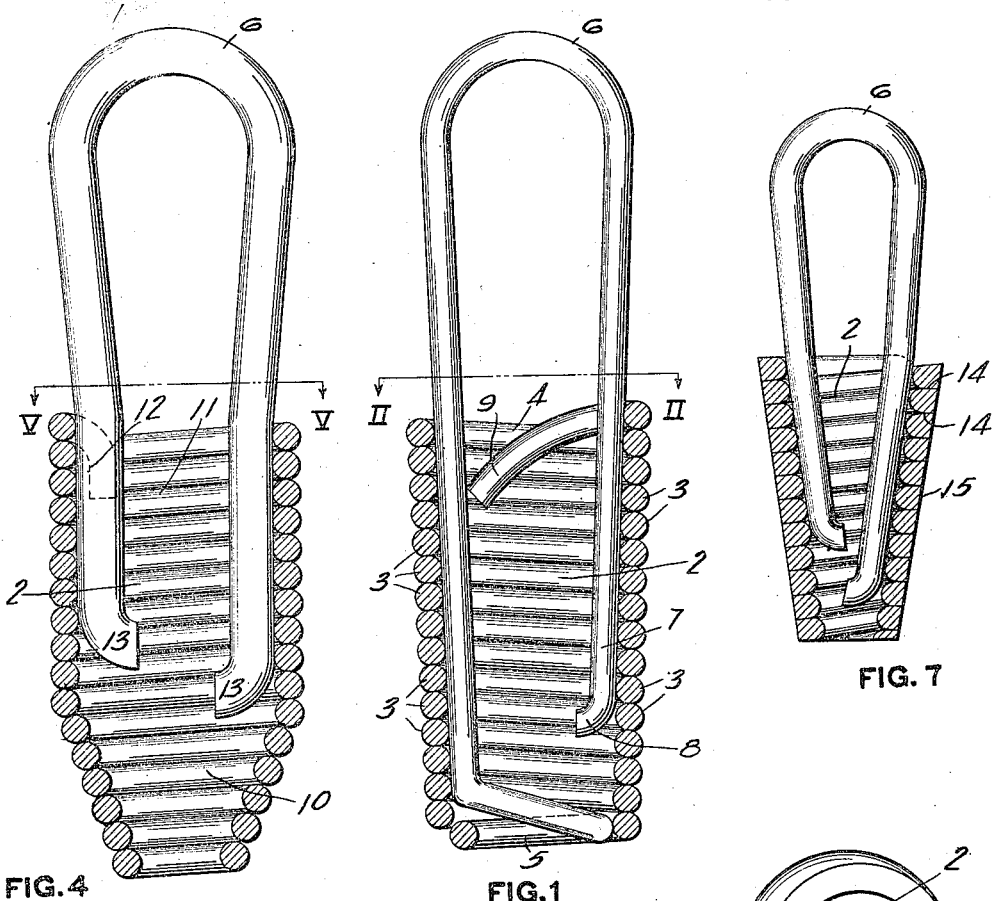

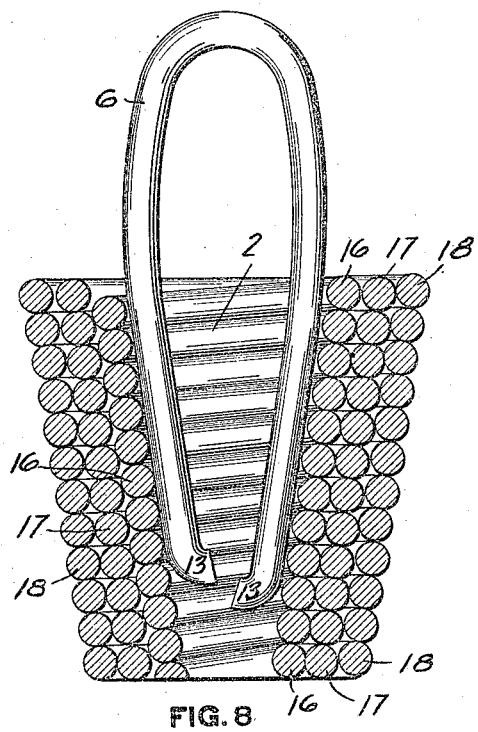
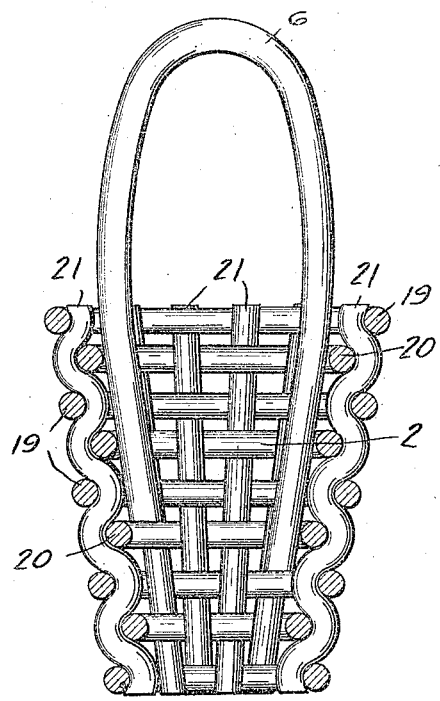
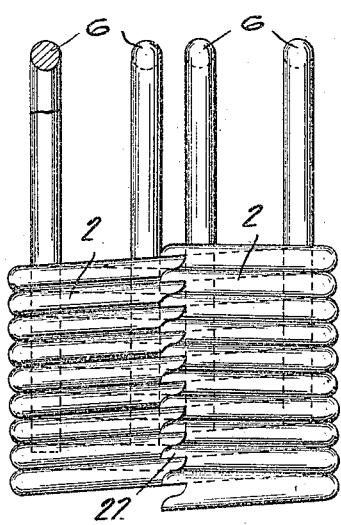
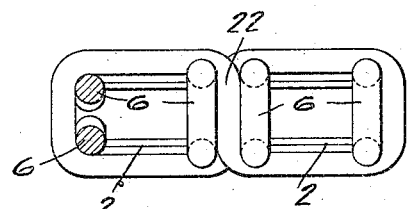
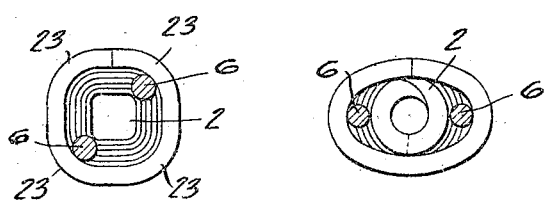

1,237,465.

Patented Aug. 21, 1917.
3 SHEETS—SHEET 3.

WITNESSES
R. D. Little
C. T. Holman

INVENTOR
R. E. Brown
by C. C. Linthicum
his Attorney

UNITED STATES PATENT OFFICE.

ROBERT E. BROWN, OF WORCESTER, MASSACHUSETTS, ASSIGNOR TO THE AMERICAN STEEL AND WIRE COMPANY OF NEW JERSEY, OF HOBOKEN, NEW JERSEY, A CORPORATION OF NEW JERSEY.

WIRE ROPE-SOCKET.

1,237,465.      Specification of Letters Patent.      Patented Aug. 21, 1917.

Application filed March 10, 1915. Serial No. 13,421.

*To all whom it may concern:*

Be it known that I, ROBERT E. BROWN, a citizen of the United States, and resident of Worcester, in the county of Worcester and State of Massachusetts, have invented certain new and useful Improvements in Wire Rope-Sockets, of which the following is a specification.

My invention relates to the construction of sockets fastened to the end of a rope or cable in connecting the rope or cable to a second member or object, and while not restricted to such construction, more particularly relates to sockets having bails or loops on one end and employed in detachably connecting wire ropes or cables to a clevis, hook or other member.

Heretofore, such rope sockets have been forged and made of cast metal, generally being formed with an integral bail or loop and a tapering opening in the shank or basket of the socket in which the end of the rope or cable is secured.

In fastening the rope or cable in the basket of the socket, its end is frayed out or broomed, and molten spelter, lead, or other soft metal or a non-metallic compound is poured in the basket of the socket after the broomed end of the rope or cable is placed therein, so as to securely fasten the broomed or frayed end of the rope in the basket and prevent its withdrawal. Such sockets have heretofore been made in the shop, and usually have been applied to the rope or cable in the shop.

One object of my invention is to provide a rope socket of novel construction, which is easily and quickly made, is readily applied for use to the rope or cable, and forms a strong and durable connection, and which is readily made in the field or shop, as occasion demands, without the employment of forging dies.

The invention consists broadly in a rope socket formed of wrought metal wire, the wire being bent or coiled to form a hollow basket in which the end of the rope or cable is fastened. A loop or bail for attaching the socket to a second member, such as a hook or clevis, is provided, the bail being made integral with the basket or separate therefrom, as found necessary or desirable.

The invention further consists in rope sockets having the novel construction and arrangement of parts shown and more fully described hereinafter.

Referring now to the drawings forming part of this specification, Figure 1 is a longitudinal section of a rope socket having an integral bail and constructed and arranged in accordance with my invention.

Fig. 2 is a sectional end elevation on the line II—II of Fig. 1.

Fig. 3 is an end elevation showing the lower end of the socket of Figs. 1 and 2.

Fig. 4 is a longitudinal section showing a modified form of socket having a separate loop or bail.

Fig. 5 is a sectional end elevation on the line V—V of Fig. 4.

Fig. 6 is an end elevation of the socket shown in Figs. 4 and 5.

Fig. 7 is a longitudinal section showing another modified form of socket constructed and arranged in accordance with my invention.

Figs. 8 and 9 are longitudinal sections showing two further modified forms of sockets made in accordance with my invention.

Fig. 10 is a longitudinal side elevation showing another form of socket constructed in accordance with my invention.

Fig. 11 is an end elevation, partly in section, of the socket construction shown in Fig. 10.

Figs. 12 and 13 are sectional end elevations showing other modified forms of sockets constructed in accordance with my invention.

Figure 15:
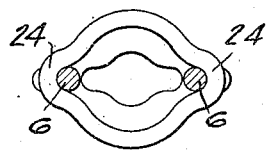
Fig. 15 is a sectional end elevation of the socket of Fig. 14, the section being taken on the line XV—XV of Fig. 14.

In the accompanying drawings, the numeral 2 designates the basket of the rope sockets, which is formed by helically winding a metal wire into a series of coils 3, 3.

The basket has open ends 4 and 5, and as shown in Figs. 1, 2 and 3, is frusto-conical in longitudinal section, the end 4 being the larger in diameter. The wire is bent at the end 5 so as to extend through the basket 2, and forms a loop or bail 6 on the large end 4 of the basket 2. The bail 6 is bent upon itself, its free end 7 extending downwardly for a substantial distance within the hollow basket 2, and the free end 7 of the bail is provided with an inwardly turned hook 8. The end 9 of the wire forming the basket at the larger end 4 thereof also is bent downwardly within the hollow basket, as is clearly shown in Figs. 1 and 2.

In applying the rope socket of Figs. 1, 2 and 3, for use, the end of the wire rope or cable is frayed or broomed and the broomed end is inserted within the basket 2 from the smaller end 5 thereof. The hollow basket is then filled with molten spelter, lead, or other soft metal, so as to fill the basket, the soft metal engaging with the individual wires of the broomed end of the rope or cable. The metal also engages with the end 9 of the wire forming the basket and the hook 8 on the end 7 of the bail 6 so as to securely hold these parts within the basket.

In the construction shown in Figs. 4, 5 and 6, the basket 2 is formed separately from the bail, and the bail 6 is formed of wire somewhat heavier than that of the basket. In this construction, the basket is formed by helically winding the wire to form a hollow basket, with the lower portion 10 of the basket having considerable taper, and the upper portion 11 being cylindrical, or practically so. The free end 12 of the wire forming the upper portion 11 of the basket 2 is bent to extend downwardly into the basket, into position to be engaged and held by the molten metal poured into the basket in fastening the end of the rope or cable therein. The bail 6 used with this construction is formed by bending a piece of wire upon itself to form a U-shaped loop with hooks 13 on the ends thereof. The hooked ends of the bail 6 are inserted within the basket 2, and after the broomed end of the wire or cable is inserted in the basket from the small end 10, the basket is filled with molten metal in the same manner as has been described, so as to secure the end of the rope and the ends of the bail 6 within the basket.

In the construction shown in Fig. 7, the frusto-conical basket 2 is formed of wire of peculiar cross section. In forming sockets in this manner the basket 2 is first formed by coiling the wire helically, and it is then shaped so as to flatten the engaging or contacting surfaces 14 of the coils and to also flatten the outer surface 15, the cross section of the wire being changed in the flattening operations from the round or cylindrical cross section of the wire when it is coiled. The bail 6 used with the rope socket of Fig. 7 is substantially the same as that shown in the socket of Figs. 4, 5 and 6, and the hooked ends 13 of the bail 6, and the broomed end of the cable or rope, are secured in the basket 2 of the socket of Fig. 7 in the same manner as has been described in the preceding figures.

In the construction shown in Fig. 8, the basket 2 is formed by winding or coiling a wire helically so as to form three separate coils or layers 16, 17 and 18, the inner and outer surface of the intermediate coil 17 being in close engagement with the outer surface of the inner coil 16 and the inner surface of the outer coil 18. The bail 6 is formed with hooks 13 in its ends, in the same manner as those shown in Figs. 4 and 7, and the bail and broomed end of a wire rope or cable are secured within the basket 2 in the same manner as in the preceding figures.

In the construction shown in Fig. 9, two tapering, open helical coils 19 and 20 are formed, the coil 19 being of somewhat larger diameter than the coil 20. Reversely bent or kinked wires 21, which extend radially, are threaded or woven in and out between the adjacent coils of the inner and outer series of coils in forming the basket 2, the coils 19 and 20 being separated or loosely wound instead of tightly wound, as in the preceding figures.

A loop or bail 6 like that of Fig. 8, except that the hooks on the ends of the loop are omitted, is employed with the hollow socket of Fig. 9. The bail 6 and a wire rope or cable are secured within the hollow basket of Fig. 9 in the same way as in the preceding figures, provision being made to prevent escape of molten metal through the interstices of the basket when fastening the rope and bail in the socket.

In Figs. 10 and 11 a double socket is shown having two baskets 2, 2, and having two bails 6, 6, in each of the two baskets. In this construction the baskets 2 are rectangular in cross section and are formed by bending a wire upon itself, with overlapping portions 22 forming the adjacent short sides of the baskets, the wires alternating in forming the abutting overlapping sides of the baskets. After the wire is wound in this manner, the baskets are compressed endwise so as to distort the metal of the overlapping ends 22 and force the other portions of the wire forming the coils into close engagement. The bails 6 are formed in the same manner as in Fig. 9, and are inserted in the baskets at the ends thereof, as shown in Figs. 10 and 11. A rope or cable is inserted in each basket, and the ropes and bails are secured therein by filling the baskets with molten spelter in the same manner as has been described.

In the construction of Fig. 12, the socket is made in the same manner as has been described in Fig. 4. In this figure, however, the basket 2 is made rectangular in cross section, with rounded corners 23 instead of being of cylindrical cross section as in Fig. 4.

In Fig. 13 the coils forming the basket 2 are made elliptical in cross section instead of being circular or rectangular. In Fig. 13, and also in Fig. 12, the bail 6 and a rope or cable are secured in the basket 2, as has been described in connection with the preceding figures.

Figure 14:
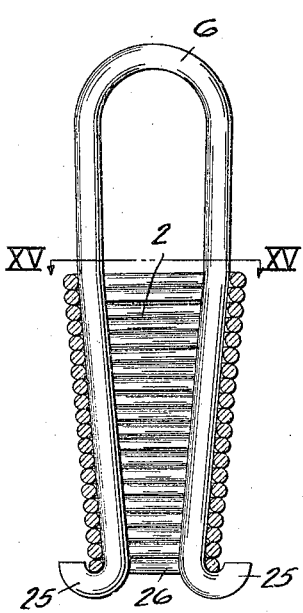
Fig. 14 is a longitudinal section showing another modification in the construction of rope sockets made in accordance with my invention.

In the socket of Figs. 14 and 15 the basket 2 is formed in a similar manner to that shown and described in connection with the socket of Fig. 4. The coils forming the basket are then bent so as to make the basket elliptical in cross section with bends or kinks 24 on opposite sides of the axis of the opening through the hollow basket, these kinks receiving the bail 6. Both legs of the bail 6 extend through the basket 2 and the lower ends thereof have outwardly turned hooks 25 formed thereon which engage the lower edge 26 of the basket 2. The basket of this socket is made to taper slightly longitudinally.

Figure 16:
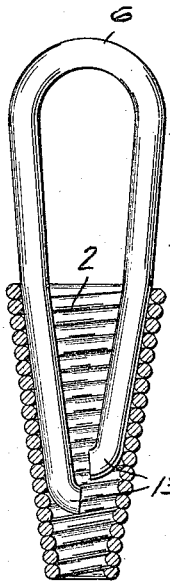
Fig. 16 is a longitudinal section showing another form of socket constructed in accordance with this invention.

In the construction of Fig. 16 the basket 2 is formed with a straight taper and the bail 6 is made with hooks 13 on its ends in the same manner as the bail of Fig. 4.

Figure 18:
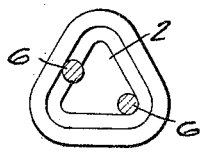
Fig. 18 is a sectional end elevation taken on the line XVIII—XVIII of Fig. 17.
Figure 17:
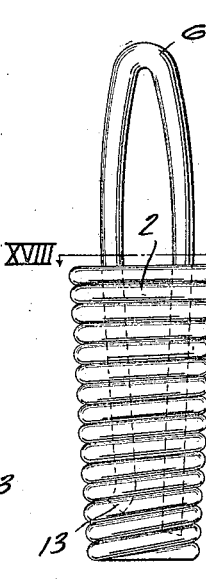
Fig. 17 is a longitudinal side elevation of another form of socket constructed in accordance with my invention.

In the construction of Figs. 17 and 18 the basket 2 is made by coiling a wire helically, the coils being bent so as to form a basket which is triangular in cross section. A bail 6 having inturned hooks 13 on the lower ends of its legs is inserted in the basket in the same manner as in Figs. 4, 7, and 16.

Figure 19:
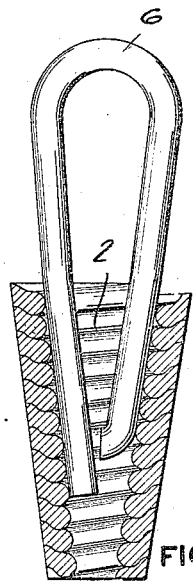
Fig. 19 is a longitudinal plan of another form of rope socket constructed in accordance with my invention.

In the construction of Fig. 19 the basket 2 is formed by coiling a wire in the manner shown and described in connection with the preceding figures. In this construction, however, the wire is not cylindrical in cross section but is of special form so that the coils will have a surface contact one with the other. The bail 6, which is formed in the same manner as those which have been described, is inserted in the basket and is secured therein, as has been described in connection with Fig. 2.

Figure 20:
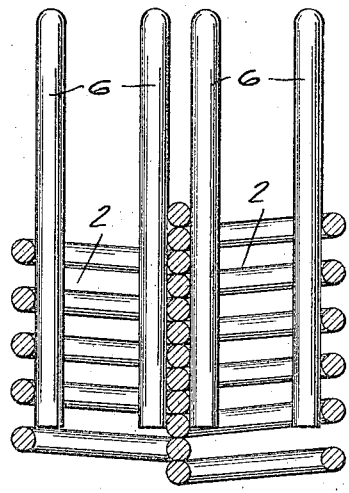
Fig. 20 is a longitudinal section, and Fig. 21 an end elevation, partly in section, showing a further modification in the construction of rope sockets made in accordance with my invention.
Figure 21:
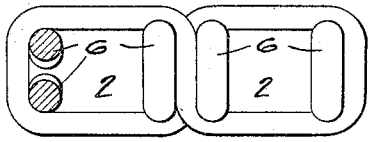

In the construction of Figs. 20 and 21, which is very similar to that shown in Figs. 10 and 11, a double basket 2, 2, is formed, each basket having two bails 6, 6, therein. In this construction the coils are open instead of being closed, as in Figs. 10 and 11. The bails 2 are formed in the same manner as in Figs. 10 and 11, and are inserted in the basket in the same way.

Means must be provided with the socket of Figs. 20 and 21 to retain the molten metal poured into, and prevent its flowing out of the baskets between the open coils used in this construction, while the metal is solidifying to fasten the ropes or cables and the bails 6 therein.

Figure 22:
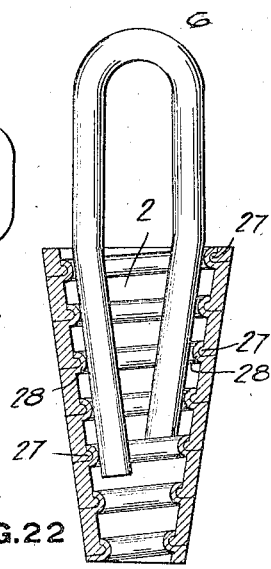
Fig. 22 is a longitudinal section showing a still further modification of my invention.

In the construction of Fig. 22 the basket 2 is formed by coiling helically a wire of peculiar cross section. This wire is provided on one edge with a semi-circular bead 27 and on the other edge with a flange or rib 28. After the wire is coiled to form the basket the flange or rib 28 is curled around the adjacent bead 27 on the opposite edge of the wire forming the coils, so as to form a closed basket in which the adjacent coils are locked together. The bail 6 is inserted, and, with a rope or cable, is secured in the basket of Fig. 22 as has been described.

The wire forming the sockets is preferably galvanized or otherwise coated before being coiled or formed, and also may be galvanized after being formed, or plain black wire may be used, as is desired. The use of coated or galvanized wire, however, will facilitate the union between the wire and molten metal used in fastening the rope or cable in the basket of the socket.

The advantages of my invention will be appreciated by those skilled in the art. The sockets are easily and cheaply made, and the necessity of drop forging or forming the sockets by casting is avoided and overcome. A socket made in accordance with my invention is readily made in the field by hand tools, and without the necessity of coiling dies.

Modifications in the construction and arrangement of the baskets and bails may be made within the scope of the invention, and the bails may be formed integrally or separate from the baskets, as desired, within the scope of the broadest of the appended claims.

The terms "rope" and "cable", as used herein, are intended to include ropes made of hemp or other fibrous material.

I claim:—

1. A rope socket comprising a tubular wire coil adapted to receive the end of a rope or cable, and a substantially U-shaped loop or bail having one end portion housed within the tubular coil and its other end portion projecting outwardly through one end of the coil and constituting an attaching device.

2. A rope socket comprising a tubular wire coil adapted to receive the end of a rope or cable, one end portion of the wire being bent into a substantially U-shaped bail or loop having one end portion housed within the coil and its other end portion projecting outwardly through one end of the coil.

3. A rope socket comprising a metal wire wound to form a hollow basket adapted to receive the end of a rope or cable and a loop or bail at one end of said basket, at least one end of said loop extending through the basket.

4. A rope socket comprising a metal wire wound to form a hollow basket adapted to receive the end of a rope or cable and a loop or bail at one end of said basket, at least one end of said loop extending through the basket, said basket tapering for at least part of its length.

5. A rope socket comprising a metal wire wound to form a hollow longitudinally tapering basket and adapted to receive the end of a rope or cable and a loop or bail at the large end of said basket for the attachment of a second member to the bail at least one end of said loop extending through the basket.

6. A rope socket comprising a metal wire wound to form a hollow basket adapted to receive the end of a rope or cable, and an integral loop or bail at one end of said basket for the attachment of a second member to said socket, the end of one leg of said loop extending into and the other leg extending through the hollow basket.

7. A rope socket comprising a metal wire wound to form a hollow basket adapted to receive the end of a rope or cable, and an integral loop or bail at one end of said basket for the attachment of a second member to said socket, at least one end of said loop extending through said hollow basket from one to the other end thereof.

In testimony whereof, I have hereunto set my hand.

ROBERT E. BROWN.

Witnesses:
J. A. MERKT,
JAMES F. HOWE.

Copies of this patent may be obtained for five cents each, by addressing the "Commissioner of Patents, Washington, D. C."